Sept. 27, 1966   E. O. SCHULZ   3,275,282
MULTIPARTITE MOLD FOR EXPANSIBLE MATERIAL
Filed Sept. 25, 1963   2 Sheets-Sheet 1

*INVENTOR.*
ERNST OTTO SCHULZ

INVENTOR.
ERNST OTTO SCHULZ

United States Patent Office 3,275,282
Patented Sept. 27, 1966

3,275,282
MULTIPARTITE MOLD FOR EXPANSIBLE
MATERIAL
Ernst Otto Schulz, Neuhaus am Rennweg, Thuringia,
Germany, assignor to Vereinigung Volkseigener Betriebe Glas Dresden, Dresden, Germany
Filed Sept. 25, 1963, Ser. No. 312,829
9 Claims. (Cl. 249—82)

The present invention relates to a multipartite mold for producing molded articles and more particularly to a mold of this type for producing block forms from material which expands especially when heated, such as foamed siliceous material like glass.

When heat expansible materials such as foamed glass are molded they are charged into a mold and subjected to controlled heat treatment up to approximately 900° C. for foamed glass. The material passes through early sintering and shrinking stages but then swells up until the entire mold cavity is filled. The mold must be provided with a cover, otherwise the material would expand out of the mold cavity.

Molds for such materials have been made from ceramic substances, however, since the molds must be initially subjected to a high temperature and, after the molded article is removed, must be rapidly cooled in ambient air, the ceramic substances of which the molds are made have great difficulty withstanding the severe temperature changes. Rapid heating and cooling is also rendered difficult because the ceramic substances have a relatively low heat conductivity. Furthermore, molds of ceramic substances do not have adequate dimensional stability.

Molds for heat-expansible materials that are in wider general use have been made of heat-resistant steel. Such molds are usually multipartite, having a separate bottom plate and a cover plate and a pair of side wall members of generally angle iron form which are assemblable for example into a rectangular frame for molding block forms. The side walls are securely held together with clips and the cover plate and bottom plate are secured to the side walls with clamps so that the entire assembly is rigidly held together.

Such molds made of sheet steel suffer from warpage which necessitates repeated adjustment and repairs and limits the useful life span of the molds. Warped molds produce molded articles such as foamed glass blocks which require considerable trimming to size with consequent waste of time and material. In continuous-type tunnel furnaces having a gravity roller conveyer over which the molds are conveyed, passage of the mold is rendered difficult and production is impeded by warpage of the molds, particularly buckling of their bottom plates, twisting moments and tangential stresses being produced as the molds are carried along by the roller conveyer.

The expanding material such as foamed glass exerts a considerable pressure on the parts of a rigidly assembled heat-resistant steel mold of this type, buckling the cover and bottom plates and sometimes escaping from the mold cavity. Furthermore, such rigidly assembled molds of heat-resistant steel have been known to crack quite easily under high pressure.

Multipartite molds of this type must also be completely disassembled to remove the molded article and then completely reassembled each time a new article is molded, causing considerable time loss and added expense. Changes in dimension of such molds after repeated use alter the volume of the mold cavity, its filling capacity, its measurements and the weight-by-volume ratio of the molded articles so that no two molded articles are alike. As aforementioned, buckling of the bottom plate of the mold, for example, causes difficulty in conveying the mold in a continuous-type roller furnace. Warped and consequently non-uniform molds must be handled by manual means as they cannot be accommodated to automatic gripping devices. In view of the foregoing disadvantages of such known molds, continuous production of molded articles with these molds is rendered well-nigh impossible.

When the mold is formed of a one-piece heat-resistant mold box, the molded article such as a foamed glass block cannot be readily removed from the mold as shrinkage of the heat-resistant steel mold on cooling is greater than that of the glass block.

Two-piece cup-like or coffin-shaped molds require special heat treatment to soften the contracted steel walls of the mold and release the finished article. Care must also be taken not to confuse a part of one mold with the corresponding part of another mold as these parts are not usually interchangeable.

It is accordingly an object of this invention to provide a multipartite mold for producing a molded article of expansible material, the components of which will not warp during use.

Another object of this invention is to provide a mold of this type which need not be fully disassembled when the molded article is to be removed nor be fully re-assembled to mold a new article.

A further object of this invention is to provide such a mold which will not crack under pressure or heat.

An additional object of this invention is to provide such a mold which will permit ready removal of the cooled molded article without requiring reheating of the mold.

A concomitant object of this invention is to provide a mold of this type that will repeatedly produce molded articles that are substantially alike in shape, weight and size.

A still further object of this invention is to provide a multipartite mold of this type whose parts are readily interchangeable with corresponding parts of a similar mold.

With these objects in view, the present invention relates to a multipartite mold for producing a molded article from expansible material which includes an assembly of substantially smooth or flat side wall members, a base member and a cover member connected to each other and defining an enclosed mold cavity. The members are movable relative to each other from positions respectively in which the mold cavity has a minimal volume to positions respectively in which the mold cavity has a maximal volume, the mold cavity having its minimal volume in an upright position of the assembly. The cavity is chargeable with expansible material in the upright position of the assembly, and the members are automatically movable by the expansion of the material to respective position in which the mold cavity has a maximal volume. The cover member is removable from the assembly and the assembly in invertible from the upright position whereby a molded article may be released from the mold cavity when the cover member is removed and the assembly is inverted without disconnecting the base member and the side wall members.

In accordance with another aspect of this invention the inverted base member and side wall members which remain connected to each other are automatically movable to their respective positions in which the mold cavity has its original minimal volume when the assembly is restored to its upright position.

In accordance with yet another aspect of the invention, the flat sides of the mold cavity diverge in direction from the base member to the cover member so that the cross-sectional area of the mold cavity adjacent the cover member is greater than its cross-sectional area adjacent the base member.

In accordance with still other aspects of the invention, the base member is provided with a plurality of guiding lugs and a plurality of supporting lugs located externally of the mold cavity. The guiding lugs extend substantially parallel to at least one of the movably connected side wall members for guiding it, and the supporting lugs extend substantially parallel to at least another of the side wall members for supporting it. The lugs are formed with a plurality of perforations and have free end portions that extend beyond the side wall plates through apertures formed in the cover plate and which are in registry therewith. Clips are removably secured to the end portion of at least some of the lugs, limiting the movement of the cover plate along the lugs and preventing accidental disconnection of the cover plate from the assembly The guiding lugs are formed with a slot extending in a direction between the base plate and the cover plate, and have a widened portion. The outer faces of the side wall plates are provided with spaced guide pins extending through and slidable in the slots, the pins having enlarged heads which are extendable into the slots only through the widened portions thereof. The side wall plates are movably connected to each other by a notch formed along an edge of one plate and a tongue or hook extending from the end of an adjacent plate and engageable in the notch of the first-mentioned plate.

In accordance with another aspect of the invention, the mold produces molded articles of siliceous material such as foamed glass and the like, the mold cavity being enlarged to a maximum volume by the expansion of the siliceous material which is received in the mold cavity as the material is heated to a predetermined maximum working temperature, the members which define the mold cavity being made of material that becomes thermoplastic at that temperature, such as rolled plate unalloyed steel.

The foregoing and other objects, advantages and features of the present invention will be apparent from the preferred embodiment illustrated by way of example in the accompanying drawings in conjunction with the following detailed description. In the drawings.

Figure 1:
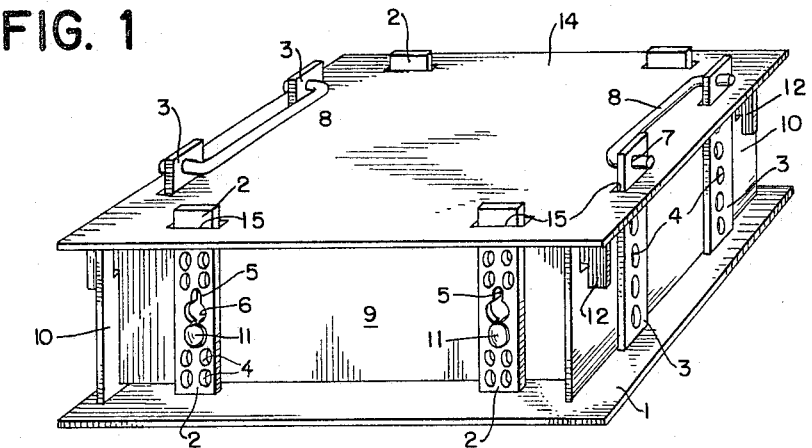
FIG. 1 is a perspective view of a multipartite mold constructed in accordance with the invention.
Figure 2:
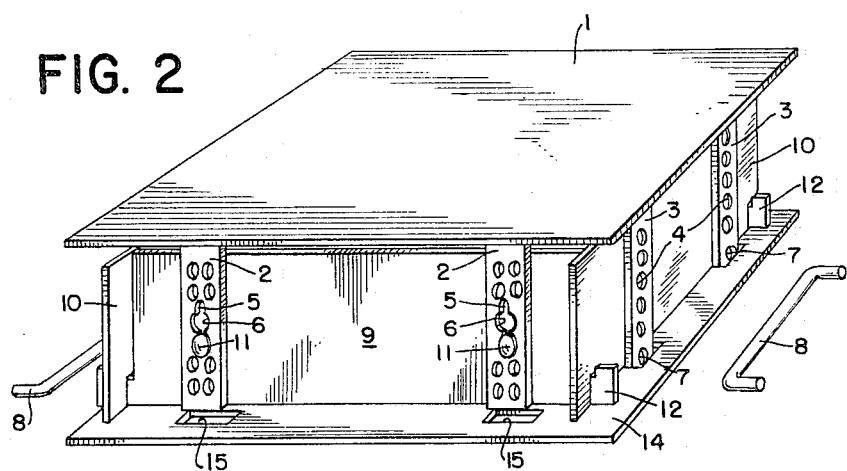
FIG. 2 is a partly exploded, perspective and inverted view of the mold shown in FIG. 1.

Referring now to the drawings and particularly to FIGS. 1 and 2, there is shown a multipartite mold for producing molded articles such as molded block of siliceous material, for example foamed glass or the like The mold has a base or bottom plate member 1 from which there extend substantially perpendicularly and adjacent the edges thereof, guiding lugs or side bars 2 and supporting or bracing lugs or side bars 3. As illustrated in FIG. 1, the base plate 1 is rectangular in form, the lugs 2, 3 being arranged in pairs along each of the edges thereof. Opposing pairs of lugs diverge slightly from each other in the direction from their place of attachment to the base plate 1 toward their free ends. The lugs 2, 3 are formed with a plurality of small perforations 4. Each of the guiding lugs 2 is additionally provided with a longitudinally extending slot 5 having a widened portion 6 approximately in its center, and the free ends of the supporting lugs 3 are provided with aperture 7 (FIG. 2) through which an end portion of the U-shaped clip 8 extends.

Figure 3:
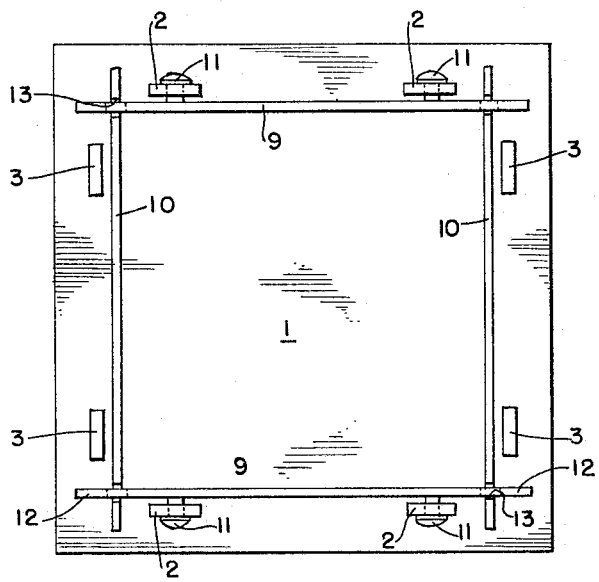
FIG. 3 is a top plan view of the mold with the cover plate removed.

As shown in FIG. 3, the side wall plate members of the mold embodying the present invention consist of a pair of opposed supported or braced side walls 9 and a pair of opposed side elements 10. Guiding pins 11 formed with fillister heads or the like are provided on the side walls 9.

The spacing between the guiding pins 11 correspond to the spacing between the guiding slots 5 in the guiding lugs 2.

Figure 4:
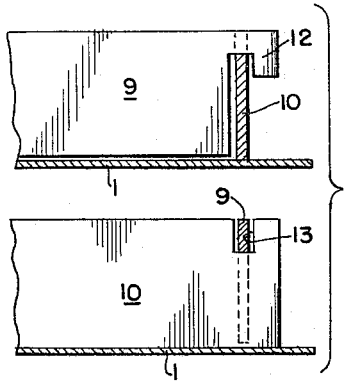
FIG. 4 shows two fragmentary elevational views of the side wall plates and their tongue and notch connections.

The ends of the side walls 9 have hook or tongue-shaped extensions 12 which engage in notches or cut-outs 13 at the ends of the side elements 10 to form loose-fitting connections with each other as shown in FIG. 4.

Figure 5:
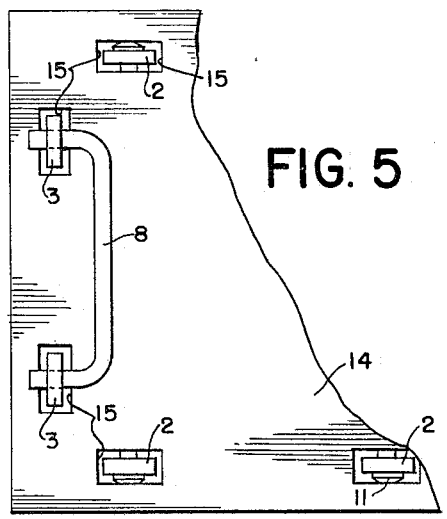
FIG. 5 is a top plan view of the fully assembeld mold, partly broken away.

A cover plate member 14 is provided with apertures 15, as shown in FIGS. 1 and 5, which are in registry with the lugs 2, 3 which have free end portions extending beyond the side walls 9 and side elements 10 and through the apertures 15.

The guiding lugs 2 and supporting lugs 3 all serve to support the side walls 9 and the side elements 10. The guiding pins 11 that extend from the side walls 9 are guided in the guiding slots 5 of the guiding lugs 2 so that the side walls 9 are afforded upward and downward freedom of movement within predetermined limits. When the mold is inverted from the position of FIG. 1 to substantially the position shown in FIG. 2 and the mold is held by its inverted base plate member 1, the side walls 9 and side elements 10 slide downwardly until the guiding pins 11 are stopped at the ends of the guiding slots 5. Actually, the side walls 9 drop downwardly until the pins 11 are stopped by the slots 5, and they carry with them the side elements 10 supported on the tongues or hooks 12, as clearly seen in FIG. 2.

A reasonable amount of play must be provided in the tongue and notch connections 12, 13 of the side wall members and between the guiding pins 11 and guiding slots 5 to permit expansion of the side walls and elements 9, 10 when the mold is subjected to heat.

Figure 6:
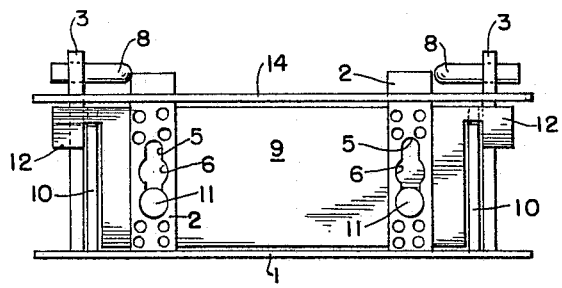
FIG. 6 is a side elevational view of the fully assembled mold embodying the present invention.

As shown in FIG. 6, when the clips 8 extend through the apertures 7 in the supporting lugs 3, the base plate 1 and cover plate 14 are interlocked and, with the side walls 9 and side elements 10, define the internal mold cavity.

The apertures 15 that are provided in the cover plate 14 adjacent its edges are of such size as to provide clearance from or play for the free ends of the guiding lugs 2 and supporting lugs 3 which extend through them to accommodate the crosswise heat expansion of the side walls 9 and side elements 10 on whose upper edges the cover plate 14 rests.

When the inner cavity of the mold is filled with material that expands such as foamed glass, the expanding material tends to raise the cover plate 14. To assure uniformity of the foamed glass block for example, the clips 8 which engage the apertures 7 in the supporting lugs 3 provide an upper limit beyond which the cover plate 14 cannot be raised.

After the clips 8 are disconnected and the cover plate 14 removed, the mold assembly is turned through an angle of substantially 180° i.e. is inverted, and the formed block drops out of the mold cavity, especially since the opposite pairs of lugs 2, 3 and consequently the opposite side wall members which are supported by the lugs diverge outwardly. When the mold assembly is then restored to its initial upright position, the side walls 9 and side elements 10 slide down the guiding slots 5 until they engage the upper face of the base plate 1. Thus, no special re-assembly of the component members of the mold is necessary as these members did not have to be disassembled in order to remove the finished molded block.

The embodiment of a foamed glass mold illustrated in the drawings and described in detail in the foregoing permits free expansion of the side walls 9 and side elements 10. The guiding lugs 2 and supporting lugs 3 which connect the base plate 1 and the cover plate 14 prevent warping of the members and permit automatic correction or alignment thereof with respect to each other.

No buckling or warping of the base plate 1 upon its being subjected to heat treatment at annealing temperatures can take place when it is supported on a flat surface or when it is transported on a gravity roller conveyer which applies an "ironing" or smoothing action to the base plate 1.

Experiments have proven tha unalloyed rolled plate is more suitable as construction material for foamed glass molds than alloyed heat-resistant steels. Rolled plate steel of this type retains sufficient rigidity at annealing temperatures of approximately 850° C. while acquiring some increased malleability at this temperature level for eliminating the stresses which occurred at lower temperatures and for smoothing out any warpage that had taken place.

The preferred embodiment illustrated and described is suitable for use in an automatic process for producing foamed glass blocks because of the mutual connections between the side walls 9 and side elements 10 which is afforded by the guiding lugs 2 and supporting lugs 3.

In thermal glass-shaping processes, it is of considerable importance that means for effecting efficient and rapid heat dissipation be provided. It is therefore desirable to avoid the use of construction members having a large mass. Perforations 4 are accordingly provided in the guiding lugs 2 and the supporting lugs 3 without impairing the strength of these elements. These perforations also serve to increase the surface area of the lugs and consequently augment heat radiation and dissipation to the atmosphere.

Due to the freedom of the side walls and side elements to expand outwardly while connection is maintained between them and between the base and cover plates, the use of appropriate rolled plate unalloyed steels, and moving the molds over a gravity roller conveyer in a proper attitude and at a proper speed, assembly line manufacture of foamed glass blocks is possible and also permitting other ancillary semi-automatic machines to cooperate in the assembly line production.

While the invention has been illustrated and described as embodied in a multipartite mold for expansible material, it is not intended to be limited to the details shown since various modifications and structural changes may be made without departing in any way from the spirit of the present invention. Other adaptations should and are intended to be comprehended within the meaning and range of equivalence of the following claims.

What is claimed is:

1. A multipartite mold for producing a molded article from expansible material, comprising an assembly of a plurality of substantially flat side wall members, a base member and a cover member movably connected to each other and defining an enclosed mold cavity, said base member having lug means secured thereto external to said mold cavity for guiding and supporting said movably connected side wall members, adjacent ones of said side wall members, said base and said cover members being movable relative to each other from positions respectively in which said mold cavity has a minimal volume to positions respectively in which said mold cavity has a maximal volume, said mold cavity having its minimal volume in an upright position of said assembly and being chargeable with expansible material in said upright position, said side wall members being automatically movable by the expansion of said material to respective positions in which said mold cavity has a maximal volume, said cover member being removable from said assembly and said assembly being invertible from said upright position, said cover member having formed therein apertures into which said lug means extend, said apertures being of the size permitting free movement of said lug means therein, whereby a molded article may be released from said mold cavity when said cover member is removed and said assembly is inverted without disconnecting said base member and said side wall members.

2. A multipartite mold for producing a molded article from expansible material, comprising an assembly of a plurality of substantially flat side wall members, a base member and a cover member movably connected to each other and defining an enclosed mold cavity, the sides of said mold cavity diverging in direction from said base member to said cover member so that the cross-sectional area of said mold cavity adjacent said cover member is greater than its cross-sectional area adjacent said base member, said base member having a plurality of guiding lugs and a plurality of supporting lugs secured thereto, said guiding lugs extending substantially parallel to at least one of said movably connected side wall members for guiding the same, and said supporting lugs extending substantially parallel to at least another of said side wall members for supporting the same, all of said lugs being located externally of said mold cavity, adjacent ones of said side wall members, said base and said cover members being movable relative to each other from positions respectively in which said mold cavity has a minimal volume to positions respectively in which said mold cavity has a maximal volume, said mold cavity having its minimal volume in an upright position of said assembly and being chargeable with expansible material in said upright position, said side wall members being automatically movable by the expansion of said material to respective positions in which said mold cavity has a maximal volume, said cover member being removable from said assembly and said assembly being invertible from said upright position, said cover member having formed therein apertures into which said lugs extend, said apertures being of the size permitting free movement of said lugs therein, whereby a molded article may be released from said mold cavity when said cover member is removed and said assembly is inverted without disconnecting said base member and said side wall members.

3. A multipartite mold for producing substantially block shaped articles from expandable material, comprising an assembly of at least four substantially flat side wall plates, a base plate and a cover plate movably connected to each other and defining an enclosed mold cavity of polygonal cross-section, the sides of said mold cavity diverging in a direction from said base plate to said cover plate so that the cross-sectional area of said mold cavity adjacent said cover plate is greater than its cross-sectional area adjacent said base plate, said base plate having a plurality of guiding lugs and a plurality of supporting lugs secured thereto, said guiding lugs extending substantially parallel to at least two of said movably connected side wall plates for guiding the same, and said supporting lugs extending substantially parallel to at least two others of said side wall plates for supporting the same, said guiding lugs and said supporting lugs being located externally of said mold cavity and having a free end portion extending beyond said side wall plates, said cover plate being formed with a plurality of apertures in registry with said lugs so that the end portions of said lugs extend through said apertures, said apertures being of the size permitting free movement of said lugs therethrough and clip means removably secured to the end portion of at least some of said lugs, said clip means limiting movement of said cover plate along said lugs and preventing disconnection of said cover plate from said assembly, adjacent ones of said side wall plates, said base plate and said cover plate being movable relative to each other from positions respectively in which said mold cavity has a minimal volume to positions respectively in which said mold cavity has a maximal volume, said mold cavity having its minimal volume in an upright position of said assembly and being chargeable with expandable material in said upright position, said plates being automatically movable by the expansion of said material to respective positions in which said mold cavity has a maximal volume, said assembly being invertible from said upright position, whereby a molded block shaped article may be released from said mold cavity when said cover plate is disconnected by removing said clips and said assembly is inverted without disconnecting said base plate and said side wall plates.

4. A multipartite mold according to claim 3 wherein the ends of said lugs are formed with an aperture and said clip means comprises at least two U-shaped rods having ends that are frictionally received in the apertures of a pair of adjacent lug end portions.

5. A multipartite mold according to claim 3 wherein said guiding lugs are formed with a slot extending in a direction between said base plate and said cover plate, the outer faces of said side wall plates being provided with spaced guide pins extending through and slidable in said slots.

6. A multipartite mold according to claim 5 wherein said slots have a widened portion, said pins having enlarged heads extendable into said slots only through said widened portion thereof.

7. A multipartite mold for producing substantially block shaped articles from expansible material, comprising an assembly of at least four substantially flat side wall plates, a base plate and a cover plate movably connected to each other and defining an enclosed mold cavity of polygonal cross-section, the sides of said mold cavity diverging in a direction from said base plate to said cover plate so that the cross-sectional area of said mold cavity adjacent said cover plate is greater than its cross-sectional area adjacent said base plate, said base plate having a plurality of guiding lugs and a plurality of supporting lugs secured thereto, said guiding lugs extending substantially parallel to at least two others of said side wall plates for supporting the same, said guiding lugs and said supporting lugs being located externally of said mold cavity, said side wall plates being movably connected to each other by a notch formed along an edge of one plate and a tongue extending from the end of an adjacent plate and engageable in the notch of said one plate, said side wall plates, said cover plate having formed therein apertures into which said lugs extend, said apertures being larger in size than the cross-sectional area of said lugs, thereby permitting free movement of said lugs therein, said base plate and said cover plate being movable relative to each other from positions respectively in which said mold cavity has a minimal volume to positions respectively in which said mold cavity has a maximal volume, said mold cavity having its minimal volume in an upright position of said assembly and being chargeable with expansible material in said upright position, said plates being automatically movable by the expansion of said material to respective positions in which said mold cavity has a maximal volume, said cover plate being disconnectible from said assembly and said assembly being invertible from said upright position, whereby a molded block shaped article may be released from said mold cavity when said cover plate is disconnected and said assembly is inverted without disconnecting said base plate and said side wall plates.

8. A multipartite mold for producing a molded article from expansible material, comprising an assembly of a plurality of substantially smooth side wall members, a base member and a cover member movably connected to each other and defining an enclosed mold cavity, the sides of said mold cavity diverging in direction from said base member to said cover member so that the cross-sectional area of said mold cavity adjacent said cover member is greater than its cross-sectional area adjacent said base member, said base member having lug means secured thereto extending substantially parallel to said side wall members and external to said mold cavity for guiding and supporting said movably connected side wall members, said members including said lug means being made of metal and said lug means being formed with a plurality of perforations, said cover member having formed therein apertures into which said lug means extend, said apertures being larger in size than the cross-sectional area of said lug means, thereby permitting free movement of said lug means therein, adjacent one of said side wall members, said cover and said base members being movable relative to each other from positions respectively in which said mold cavity has a minimal volume to positions respectively in which said mold cavity has a maximal volume, said mold cavity having its minimal volume in an upright position of said assembly and being chargeable with expansible material in said upright position, said members being automatically movable by the expansion of said material to respective positions in which said mold cavity has a maximal volume, said cover member being removable from said assembly and said assembly being invertible from said upright position, whereby a molded article may be released from said mold cavity when said cover member is removed and said assembly is inverted without disconnecting said base member and said side wall members.

9. A multipartite mold as claimed in claim 1, wherein said lug means diverge in direction from said base member to said cover member, so that said side wall members, when moved by said expansible material, define said mold cavity as having a cross-sectional area adjacent to said cover member greater than the cross-sectional area thereof adjacent said base member.

No references cited.

J. SPENCER OVERHOLSTER, *Primary Examiner.*

J. H. FLINT, *Assistant Examiner.*